United States Patent Office 3,823,217
Patented July 9, 1974

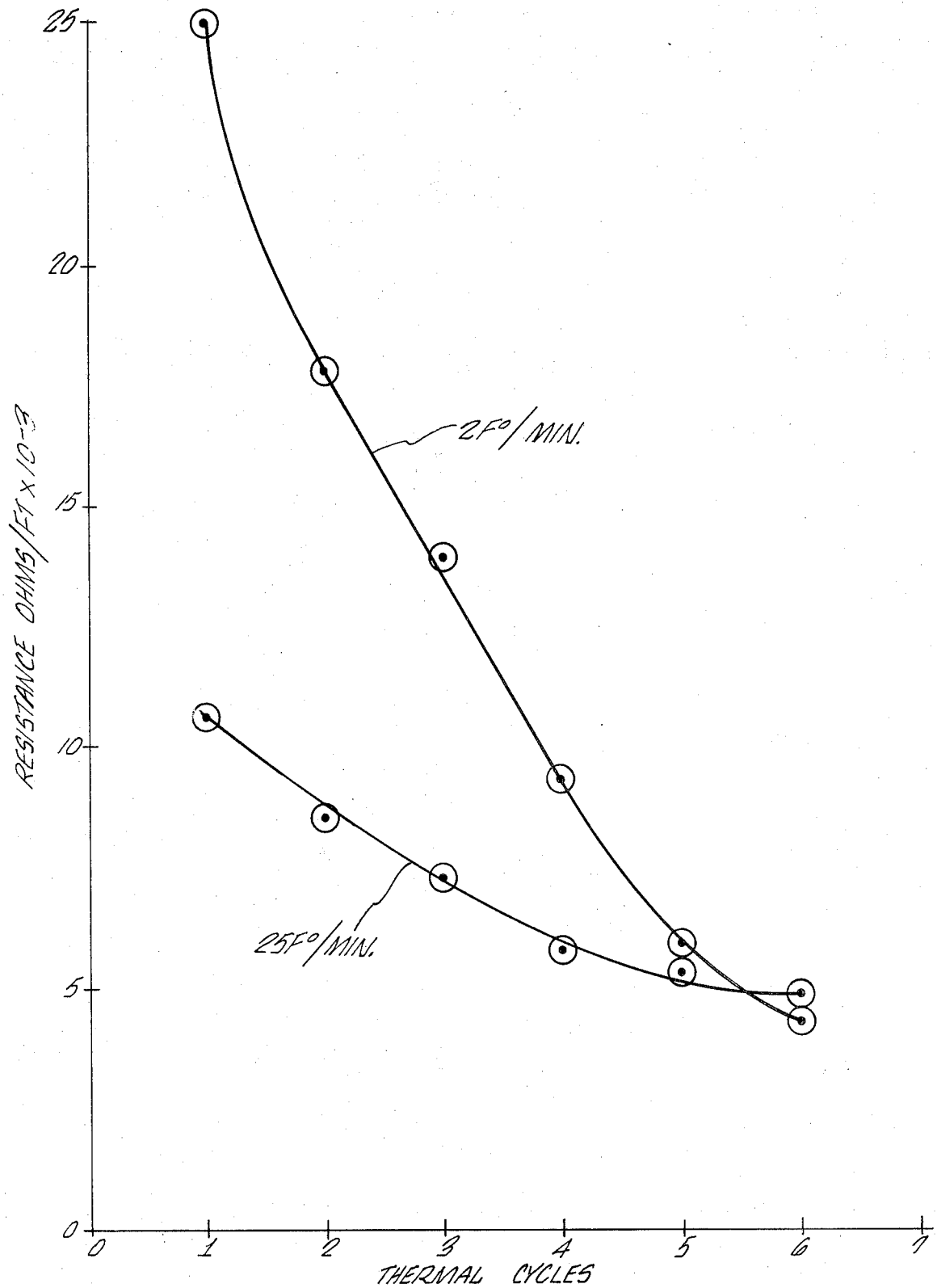

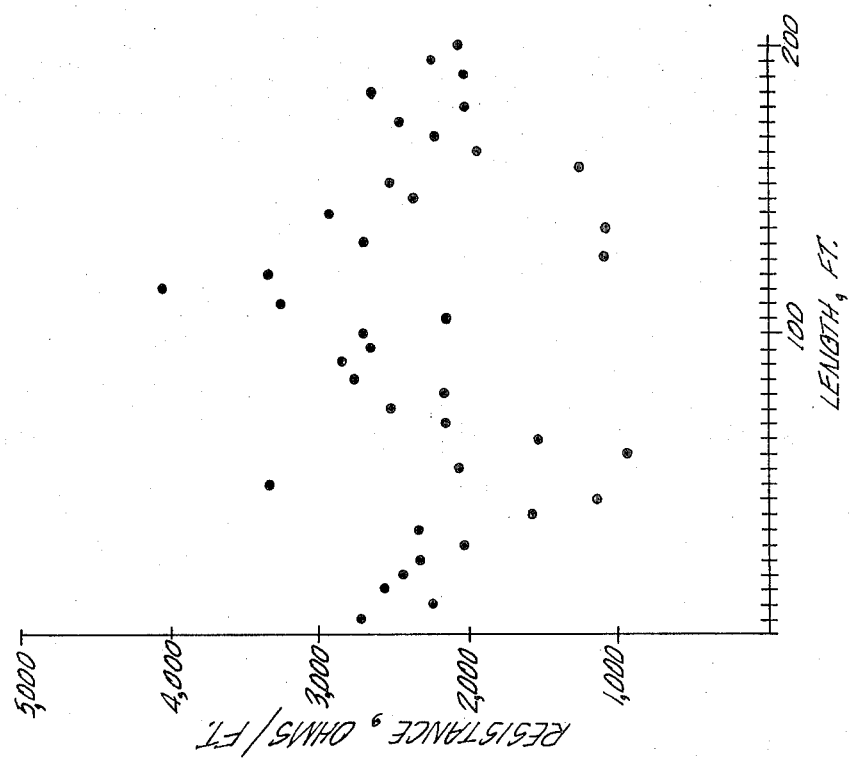
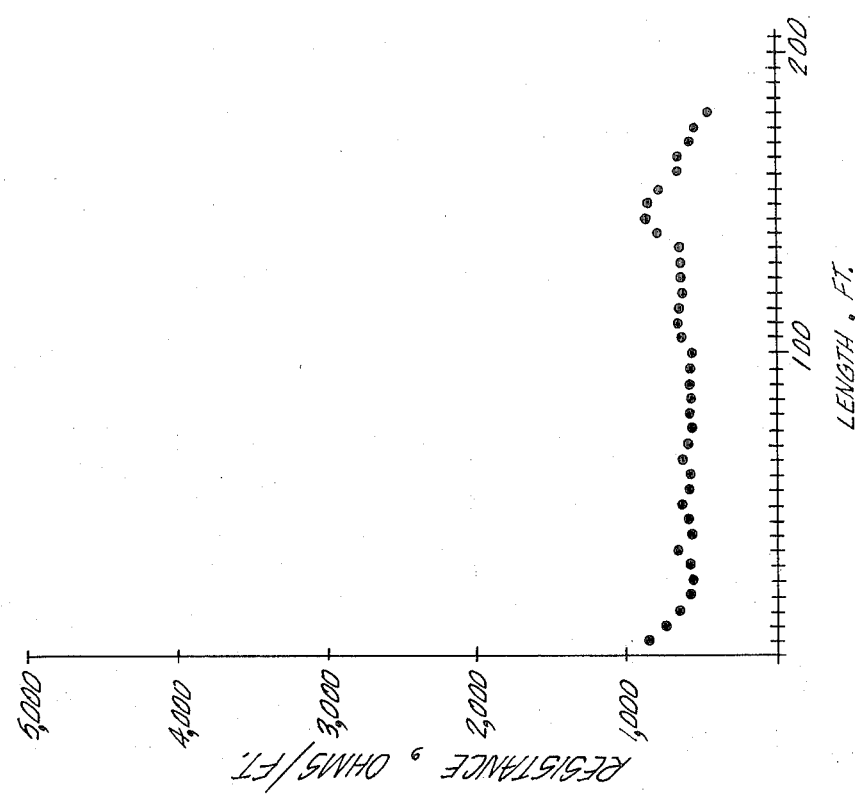

3,823,217
RESISTIVITY VARIANCE REDUCTION
Andrew J. Kampe, Half Moon Bay, Calif., assignor to Raychem Corporation, Menlo Park, Calif.
Filed Jan. 18, 1973, Ser. No. 324,786
Int. Cl. C04b 35/52
U.S. Cl. 264—105
10 Claims

ABSTRACT OF THE DISCLOSURE

In the heat treatment of conductive carbon black-containing self-temperature regulating articles such as resistive heaters to reduce their as-formed resistivity to a value within the range from 5 to about 100,000 ohm-cm., dependence of resistivity on thermal history is reduced, resistivity variance from point to point along the article is diminished, and resistivity of the article for a given content of carbon black is reduced by exposing the article to successive thermal cycles in each of which the article is brought from a first temperature less than the melting temperature of a crystalline polymeric matrix in which the carbon black is dispersed to a second temperature at or above the same, whereafter the article is permitted to cool below that crystalline melting temperature. In the preferred extruded form where the crystalline polymeric matrix is comprised of blended polyethylene and ethylene-ethyl acrylate copolymer and contains not more than about 15% by weight carbon black, thermal cycling is preferably calculated to achieve total exposure on the order of 24 hours to oven temperatures of about 300° F. over about 5–9 thermal cycles.

CROSS-REFERENCE TO RELATED APPLICATIONS

Figure 4:
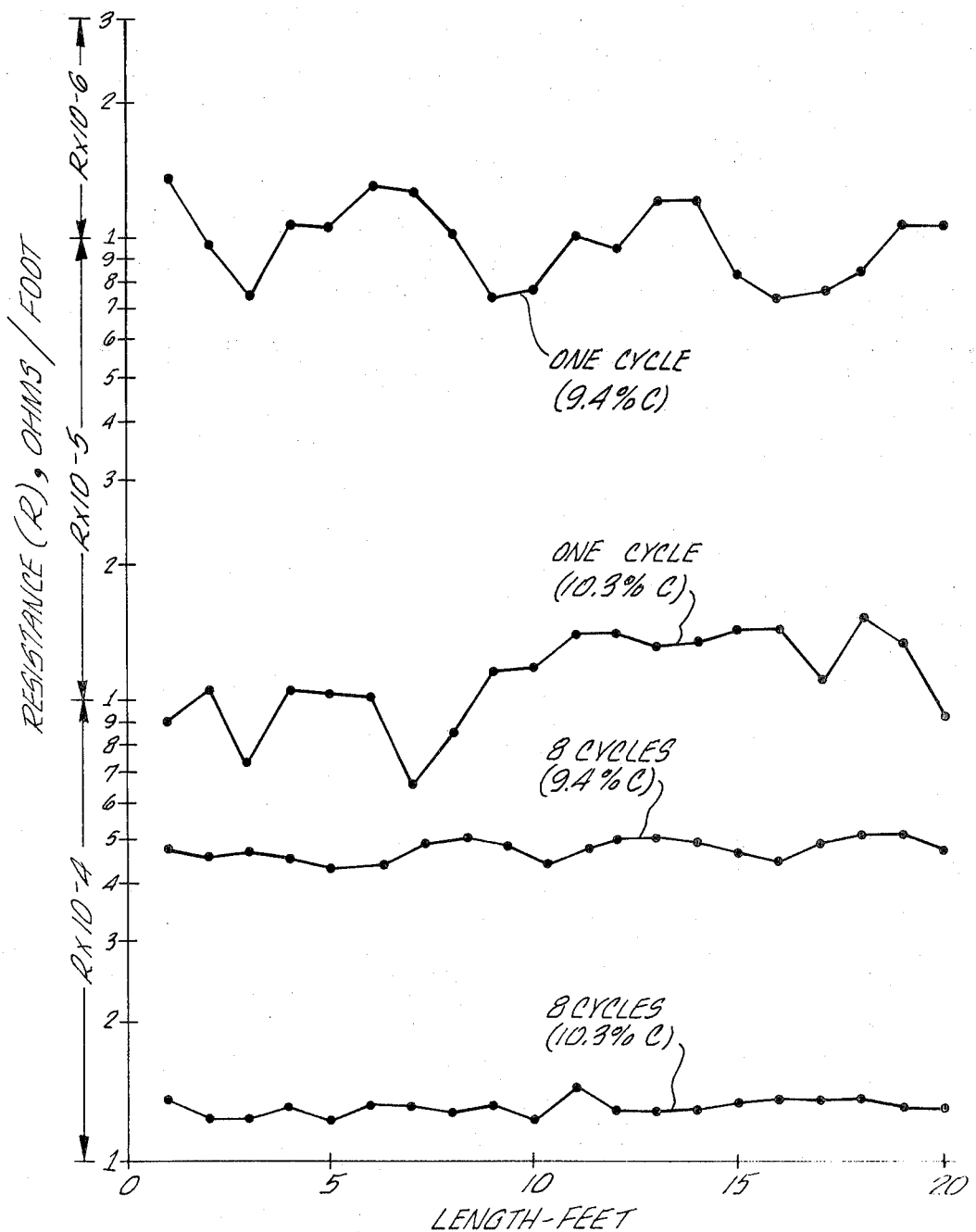

This application is related in subject to commonly-assigned application Ser. No. 287,442, 287,443 and 287,-444, each filed Sept. 8, 1972, and to the commonly-assigned application Ser. No. 319,492 of Bedard and Kampe for Voltage Stress-Resistant Conductive Articles, filed on Dec. 29, 1972.

BACKGROUND OF THE INVENTION

Electrically conductive thermoplastic compositions have previously been achieved by the addition of conductive carbon black to a polymeric base. In one category of such compositions, advantage has been taken of a non-linear positive temperature resistivity coefficient displayed by the particular material to obtain self-regulating or current-limiting semi-conductive articles. In U.S. Pat. No. 3,243,753 to Kohler, one such composition is described as containing from 25% to 75% carbon black about which the polymeric matrix has been formed by *in situ* polymerization. As the temperature of such a composition increases, either through a rise in ambient temperature or by reason of resistive heating occasioned by the passage of current therethrough, the polymer matrix expands at a rate greater than that of the carbon black particles which, in an interconnected array of channels, impart the property of conductivity. The resulting diminution in the number of current-carrying channels decreases the amount of power generated by $I^2R$ heating. This self-limiting feature may be put to work in, e.g., heat tracing pipes in chemical plants for freeze protection, maintaining flow characteristics of viscous syrups, etc. In such applications, articles formed from the conductive composition ideally attain and maintain a temperature at which energy lost through heat transfer to the surroundings equals that gained from the current. If the ambient temperature then falls, increased heat transfer to the surroundings is met by increased power generating owing to the resistivity decrease associated with the article's lowered temperature. In short order, parity of heat transfer and power generation is again attained. Conversely, where ambient temperature increases heat transfer from the conductive article is reduced and the resistivity rise resulting from increased temperature diminishes or stops $I^2R$ heating.

Self-regulating conductive compositions may, of course, be used in employments other than resistive heating, for example, in heat sensing and circuit-breaking applications. In every case, however, the high carbon black content characteristic of most prior art compositions is disadvantageous. High black loadings are associated with inferior elongation and stress crack resistance, as well as low temperature brittleness. In addition, high black loading appears to adversely affect the current-regulating properties of the conductive compositions. If a semi-conductive thermoplastic composition is externally heated and its resistivity plotted against temperature (on the abscissa) the resulting curve will show resistivity rising with temperature from the low room temperature value ($R_i$) to a point of "peak resistance" ($R_p$), following which additional increase in temperature occasions a precipitous resistivity drop associated with the melt phase of the polymer matrix. To avoid resistance runaway with the concomitant irreversible change in resistivity characteristics, the practice of cross-linking the polymer matrix has grown up, in which event resistivity levels off at the peak temperature and remains constant upon further increase in ambient temperature. Cross-linked semi-conductive articles with high black loadings exhibit undesirably low resistivity when brought to peak temperature by exposure to very high or low ambient temperatures. In such instances poor heat transfer characteristics can prevent dissipation of $I^2R_p$ generation, causing burnout.

Ultimately, both low black loading and resistivities within the useful range of from 5 to 100,000 ohm-cm. were obtained (see the aforesaid copending application Ser. No. 287,443 of Smith-Johannsen and Walker) by subjecting black-containing articles to prolonged thermal structuring, as by heating the articles at temperatures above the crystalline melting point of their black-containing crystalline polymer matrices continuously for substantial periods on the order of e.g., from about 15 to about 24 hours or more. While as a result of that thermal structuring low black-containing articles with commercially useful resistivities have been secured, it now appears that articles so made exhibit a substantial degree of variance in resistivity from point to point along their lengths.

BRIEF SUMMARY OF THE INVENTION

According to this invention, the process of forming an electrically conductive self-temperature regulating article comprised of a composition containing a crystalline polymeric matrix through which is dispersed conductive carbon black in an amount not greater than about 15% by weight based on the total weight of carbon black and matrix wherein the article is heated to or above the crystalline melting temperature of the crystalline component of the matrix for a time sufficient to reduce the resistivity of the article at 70° F. from a greater value to one within the range from about 5 to about 100,000 ohm-cm. is improved in that dependence of resistivity on thermal history is reduced, resistivity variance from point to point along the article is diminshed and resistivity of the article for a given content of carbon black is reduced, all by exposing the article to successive thermal cycles in each of which the articles is brought from a first temperature less than the said melting temperature to a second temperature at or above the same, and then permitted to cool below said melting temperature.

The manner in which these and other objects and advantages of the invention are obtained will be made clear from the detailed description of the invention which follows and from the accompanying drawings in which:

FIG. 1 graphically demonstrates reduction by thermal cycling of the absolute resistivity of articles prepared according to the invention and the manner in which dependence on thermal history is diminished according to one embodiment of this invention;

FIGS. 2 and 3 permit comparison of resistance variation from point to point along the length of a first article produced according to this invention to that exhibited by an article prepared according to the prior art (FIG. 3); and FIG. 4 compares resistivity level and variation for various black-containing compositions to corresponding properties of similar compositions prepared according to the prior art.

DETAILED DESCRIPTION OF THE INVENTION

In order to most optimally obtain self-limiting compositions, the polymeric matrix in which conductive black is dispersed in what ever proportion should exhibit overall on appropriately non-linear coefficient of thermal expansion, for which reason a degree of crystallinity is believed useful. Polymers exhibiting at least about 20% crystallinity as determined by X-ray diffraction are suited to the practice of the invention. Among the many polymeric matrices with which the invention may be practiced are polyolefins such as low, medium and high density polyethylenes and polypropylene, polybutene-1, poly (dodecamethylene pyromellitimide), ethylene-propylene copolymers and terpolymers with non-conjugated dienes, polyvinylidine fluoride, polyvinylidine fluoride-tetrafluoroethylene copolymers, etc. As is known, blends of polymeric substances may also be employed as the matrices in which the carbon black is dispersed. Typically, the minor polymeric blend component is chosen for superior compatibility with carbon black relative to the blend component present in major proportion, while the latter component is selected for the particular physical properties desired in the overall article. The principal blend component is preferably present in at least about 3:1 weight ratio relative to the minor component with which the black is first mixed. Presently, the blends most preferred have a polyethylene as the principal component, the other being an ethylene-vinyl ester copolymer, such as ethylene-vinyl acetate or ethylene-ethylacrylate copolymers. An especially preferred polymeric matrix contains about 70:20 polyethylene:ethylene-ethyl acrylate copolymer by weight. As will be recognized by those skilled in the art, limiting temperatures tailored to the application intended (e.g., freeze protection, thermostatting, etc.) may be obtained by appropriate selection of polymeric matrix material. For example, elements which self-limit at temperatures on the order of 100° F., 130° F., 150° F., 180° F. and 250° F. may be produced with, respectively, wax-poly (ethylene-vinyl acetate) blends, low density polyethylene, high density polyethylene, polypropylene and polyvinylidene fluoride. Other criteria of polymer selection will, in particular instances, include desired elongation, environmental resistance, ease of extrusibility, etc. as is well known.

The carbon blacks employed are those conventionally used in conductive plastics, e.g., high structure varieties such as furnace and channels blacks. Other conventional addends such as antioxidants, etc., may be employed provided only that their quantities and characteristics do not subvert the objects of the invention. An especially beneficial class of addends where high in-service voltage stress is anticipated includes the polymeric amines and carboxylic acid group-containing polymers disclosed in the aforesaid application of Bedard and Kampe, the disclosure of which is incorporated herein by reference.

In the preferred embodiments, the black-containing matrix is extruded onto a parallel, spaced-apart pair of elongate electrodes to form an element rod-shaped or, most preferably, dumbell-shaped in cross-section, the extruded thermoplastic both encapsulating and interconnecting the electrodes. Other means (e.g., the fusion or solvent-casting techniques of aforesaid application Ser. No. 278,443) may be employed to combine electrodes and black-containing polymer, all dependent upon the particular end-product configuration desired.

The total period over which the carbon black-containing articles are exposed to temperatures at or above melt temperature is at least that calculated to reduce resistivity to a value within the range from about 5 to about 100,000 ohm-cm. (as used herein, the terms "melt temperature" and "crystalline melting temperature" refer to the melting temperature or range of the crystalline component of the polymeric matrix in which the carbon black is dispersed). In the freeze protection applications in which self-temperature regulating elements are most commonly employed it is desirable that at least about 4–8 watts per foot be available for transfer to ambient. With commonly available voltages ranging from 120 to 480 volts, resistivity values of the preferred elongate configuration (see Example 1A, infra) should be in the range from about 6,000 to 100,000 ohm.-cm. for 4 watts/foot generation and, of course, lower at a particular voltage to obtain as much as 8 watts/foot.

With conductive compositions containing from about 5 to about 15 percent by weight conductive black, total time at or above crystalline melting temperature is generally in excess of about 15 hours and in the preferred embodiments of the invention ranges from about 24 to about 28 hours. Upon prolonged exposure of the semiconductive compositions employed in this invention to temperatures in excess of melt, resistivity will generally be seen to decline to a minimum and then commence to increase upon continued heating. Preferably, total exposure to such temperatures is less than that which occasions such resistivity increase but yet sufficient to bring resistivity to the desired level.

Between heating increments, the articles need only be cooled to below crystalline melting temperature, no apparent advantage other than convenience in heat scheduling arising from their cooling to ambient.

Advantage is realized where but 2 thermal cycles are had, as FIG. 1 (discussed infra) demonstrates, but preferably in order to minimize resistivity dependence on thermal history, total time at temperature at or in excess of melt temperature is the summation of at least about 5 and preferably at least about 8 incremental periods of exposure to that temperature. Thus, far, my work indicates no apparent criticality in the length of individual heating increments, providing only that for the sake of reproducibility during each period the article be permitted to attain temperature equilibrium with its surroundings and afforded sufficient time to display relatively uniform temperature along its length. Generally, a minimum of about ½ hour exposure to melt temperature or above per cycle suffices, at least one hour being preferred, and greater periods at temperature generally resulting from division of the total exposure time approximately evenly among the number of thermal cycles had in a particular case.

Because the black-containing polymeric matrix is in the melt during thermal cycling, that extrudate is preferably supplied prior to heat treatment with an insulative extruded jacket of a thermoplastic material which is shape-retaining when brought to above melt temperature. Suitable jacketing materials are discussed in length in the aforesaid application S.N. 287,442.

Upon completion of thermal cycling and optional addition of a further insulative jacket of, e.g., polyethylene, the self-limiting element is desirably subjected to ionizing radiation sufficient in strength to cross-link the black-containing core. Radiation dosage is selected with an eye to achieving cross-linking sufficient to impart a degree of thermal stability requisite to the particularly intended application without unduly diminishing crystallinity of the polymer matrix, i.e., diminution of overall crystallinity of the cross-linked black-containing matrix to less than about 20% is preferably avoided. Within those guidelines, radiation dosage may in particular cases range from about 2 to 15 megarads or more and preferably is about 12 megarads.

The invention is further illustrated in the examples of preferred embodiments thereof which follow, in which all parts and percentages are by weight unless otherwise indicated. The resistance measurements, for convenience, are expressed in ohms/foot and for the particular configuration tested may be converted to ohm-cm. values by multiplying by 1.83. All resistance values in this specification and in the appended claims, unless otherwise characterized, are as measured at 70° F.

EXAMPLE 1

(A) Sample construction 70.3 lbs. of polyethylene (density 0.929 gm./cc.), 28.7 lbs. of a mixture of 34% Vulcan XC-72 and ethylene-ethyl acrylate copolymer (density 0.930 gm./cc. 18% ethyl acrylate), were loaded with 1 lb. of antioxidant into a Banbury mixer. The ram was closed and mixing commenced. When temperature reached about 240-250° F. the batch was dumped, placed in a 2-roll mill, and cut off in strips which were fed to a pelletizing extruder. The pelletized compound was next extruded onto two parallel tinned copper electrodes (20 AWG 19/32) to form an extruded generally dumbbell-shaped in cross-section. The electrodes were .275 inch apart (center-to-center), the interconnecting web about 15 mils in thickness, at least 8 mils thickness of the semiconductive composition surrounding the electrodes. Extrusion was performed in a plasticating extruder with crosshead attachment (Davis-Standard 22" extruder, 24/1 L/D, with PE screw). Thereafter, the same extruder was arranged to extrude an 8 mil thick insulation jacket of polyurethane (Texin 591-A, available from the Mobay Corporation). For optional geometric conformation, a conventional tube extrusion method was employed in which a vacuum (e.g. 5-20 in. $H_2O$) is drawn in the molten tube to collapse it about the semiconductive core within about 3 inches of the extrusion head.

(B) Cycling

Samples prepared as in part A above were cut into one foot lengths and placed for 28 hours in a 300° F. oven according to the following protocol. A first sample received continuous exposure to oven temperature over 28 hours. Others were removed, respectively, after 18, 20, 22, 24 and 26 hours, cooled and thereafter their 28 hour exposure to oven temperature completed in two hour increments with cooling to ambient (70° F.), in each case between heat increments, at the rate of about 2 F.°/min. Following completion of each sample's 28 hour exposure period, its resistance was measured with a Leeds and Northrup bridge. A second experiment was also performed, identical to the foregoing in all save that the samples were allowed to cool more quickly (about 25°/min.) by exposure to ambient air between incremental oven heating stages.

(C) Comparison of resistance levels

Resistance levels of samples heated as in part B above are plotted as a function of number of cycles at 300° F. (FIG. 1). The curves illustrate that: (1) for equal time at temperature a lower level of resistance is achieved with successive thermal cycling; and (2) while the resistance level is somewhat dependent on the cooling rate initially, this dependence diminishes with succeeding cycles and is essentially eliminated after about 5 cycles. The significance of point 2 is that cycling can be used in regulation of resistivity variation without necessitating control of cooling rate.

EXAMPLE 2

Sample construction and composition was as in Example 1, save that samples were coiled on flat aluminum discs in about 500 foot lengths. One disc was exposed to a thermal cycle of 27 hours at 300° F., while the second disc was exposed to 9 cycles of 3 hours at 300° F. and 9 hours cooling per cycle. A comparison of FIGS. 2 and 3 clearly indicates the reduction in resistance variability as well as the lower absolute value of resistance attained where thermal cycling was practiced.

EXAMPLE 3

Samples were prepared as in Example 2, save that the composition of the Banburyed conductive composition was varied as indicated in Table I. A 5 lb. batch was prepared in each case.

TABLE I.—CORE COMPOSITION VARIED

| Carbon | Polyethylene | Ethylene ethyl acrylate copolymer | Antioxidant |
|---|---|---|---|
| 9.4 | 70.8 | 18.8 | 1 |
| 9.7 | 70.6 | 18.7 | 1 |
| 10.0 | 70.4 | 18.6 | 1 |
| 10.3 | 70.2 | 18.5 | 1 |

Samples prepared from all four compositions were coiled on separate aluminum discs and placed in a hot air circulating oven at 300° F. for 24 hours continuously. A second set of samples was placed in an oven and the temperature was allowed to cycle thermally for eight cycles again resulting in approximately a total of 24 hours at 300° F. In the case of this example, each thermal cycle was comprised of an eight hour "hold" at 140° F., a rise in sample temperature from 140° F. to about 300° F. over about one-half hour, about two and one-half hours at about 300° F., and a decline in sample temperature from 300° F. to 140° F. over about one hour. At the end of the thermal treatment a twenty foot section was removed from each reel, cut into one foot segments and resistance measurements were taken. The mean and standard deviation was calculated and is summarized in Table II.

TABLE II
Resistance—Ohms/foot

| Percent carbon | 24 hours at 300° F.—one cycle | | 24 hours at 300° F.—eight cycles | |
|---|---|---|---|---|
| | Mean | Standard deviation | Mean | Standard deviation |
| 9.4 | 1,045,000 | 286,000 | 47,800 | 2,520 |
| 9.7 | 888,000 | 173,000 | 39,800 | 2,600 |
| 10.0 | 193,000 | 60,900 | 18,000 | 1,486 |
| 10.3 | 114,000 | 24,400 | 13,100 | 585 |

The data for the 9.4% and 10.3% carbon samples was plotted and is displayed in FIG. 5. Examination of the data once again displays the reduction of variance in resistivity and the lower level of resistance achieved through thermal cycling.

I claim:
1. In the process of forming an electrically conductive self-temperature regulating article comprised of a composition containing a crystalline polymeric matrix throughout which is dispersed conductive carbon black in an amount not greater than about 15 percent by weight based on the total weight of carbon black and said matrix and powerable by a pair of spaced-apart electrodes wherein said composition is heated to or above the crystalline melting temperature of the crystalline components of said matrix for a time sufficient to reduce the resistivity of said article at 70° F. from a greater value to one within the range from about 5 to 100,000 ohm-cm., the improvement whereby dependence of resistivity on thermal history is reduced, resistivity variance from point to point along said article is diminished and resistivity of said article for a given content of carbon black is reduced which comprises exposing said article to successive thermal cycles in each of which the article is brought from a first temperature less than said melting temperature to a second temperature at or above the same, and then permitted to cool below said melting temperature.

2. The process of claim 1 wherein during each such cycle said article is exposed to temperature at or in excess of said melting temperature for at least about one-half hour.

3. The process of claim 2 wherein said article undergoes a total period of exposure to temperature at or above said melting temperature in excess of about 15 hours.

4. The process of claim 3 wherein said article is so thermally cycled at least about 5 times.

5. The process of claim 1 wherein said article is so thermally cycled at least about 8 times.

6. The process of claim 3 wherein said article is so thermally cycled at least about 8 times.

7. The process of claim 1 wherein said polymeric matrix comprises in major proportion polyethylene and, in minor proportion relative thereto, a copolymer of ethylene and ethyl acrylate.

8. The process of claim 4 wherein said polymeric matrix comprises in major proportion polyethylene and, in minor proportion relative thereto, a copolymer of ethylene and ethyl acrylate.

9. The process of claim 2 wherein said article is comprised of an extruded length of a composition consisting essentially of said carbon black dispersed in said matrix and powerable by a pair of elongate parallel electrodes disposed in spaced-apart relation along said length and joined by a web of said composition.

10. The process of claim 5 wherein said article is comprised of an extruded length of a composition consisting essentially of said carbon black dispersed in said matrix and powerable by a pair of elongate parallel electrodes disposed in spaced-apart relation along said length and joined by a web of said composition.

References Cited

UNITED STATES PATENTS 3,243,753    3/1966    Kohler _____ 338—31

ROBERT F. WHITE, Primary Examiner

T. E. BALHOFF, Assistant Examiner

U.S. Cl. X.R.

219—535; 264—104, 234; 388—22 R